US009561970B2

(12) United States Patent
Malcolm

(10) Patent No.: US 9,561,970 B2
(45) Date of Patent: Feb. 7, 2017

(54) AUDIO DEVICE FOR ALTERING WATER STRUCTURE

(71) Applicant: Christopher Malcolm, Vancouver (CA)

(72) Inventor: Christopher Malcolm, Vancouver (CA)

(*) Notice: Subject to any disclaimer, the term of this patent is extended or adjusted under 35 U.S.C. 154(b) by 0 days.

(21) Appl. No.: 14/246,188

(22) Filed: Apr. 7, 2014

(65) Prior Publication Data
US 2015/0036860 A1 Feb. 5, 2015

Related U.S. Application Data

(60) Provisional application No. 61/860,077, filed on Jul. 30, 2013.

(51) Int. Cl.
H04R 1/02 (2006.01)
C02F 1/00 (2006.01)

(52) U.S. Cl.
CPC .................................. C02F 1/005 (2013.01)

(58) Field of Classification Search
CPC .................................. H04R 1/02; H04R 1/42
USPC .......... 381/87, 89, 300, 304, 305, 332, 337, 338,381/353, 335, 345–348, 351, 354; 181/144–147, 198–199
See application file for complete search history.

(56) References Cited

U.S. PATENT DOCUMENTS

| 3,729,061 | A | * | 4/1973 | Tamura | 181/146 |
| 7,319,766 | B2 | | 1/2008 | Hall | |
| 2001/0024509 | A1 | * | 9/2001 | Carver | 381/395 |
| 2005/0169494 | A1 | * | 8/2005 | Stiles et al. | 381/337 |
| 2007/0165899 | A1 | | 7/2007 | Garin | |
| 2007/0259716 | A1 | * | 11/2007 | Mattice et al. | 463/36 |
| 2008/0085029 | A1 | | 4/2008 | Hagman | |
| 2010/0032234 | A1 | * | 2/2010 | Niwa et al. | 181/290 |
| 2010/0054487 | A1 | * | 3/2010 | Pan | 381/58 |
| 2011/0196188 | A1 | | 8/2011 | Giertz | |
| 2012/0250924 | A1 | * | 10/2012 | Nicholson et al. | 381/334 |
| 2013/0016845 | A1 | * | 1/2013 | Bryan | 381/63 |
| 2013/0264146 | A1 | * | 10/2013 | Nason et al. | 181/290 |

* cited by examiner

*Primary Examiner* — Ahmad F Matar
*Assistant Examiner* — Katherine Faley
(74) *Attorney, Agent, or Firm* — Global Intellectual Property Agency, LLC; Daniel Boudwin

(57) ABSTRACT

An audio device adapted for altering the structure of water is provided. The device includes a rigid, enclosed cabinet with speakers mounted to the cabinet. The speakers are positioned on opposing walls, facing each other, within the cavity of the cabinet and a watertight container is placed between the speakers. The exterior surface of the container rests directly against with the cone or the voice coil of the speakers, which are connected to an external sound system. Because the container is flush against the surface of the speakers, vibrations from the sound waves generated by the cone or the voice coil are transferred directly through the water. The sound waves alter the structure of the water from a liquid form to a liquid crystalline form, such that the liquid crystalline takes coherent geometric shapes.

20 Claims, 8 Drawing Sheets

AUDIO DEVICE FOR ALTERING WATER STRUCTURE

CROSS REFERENCE TO RELATED APPLICATION

Figure 1:
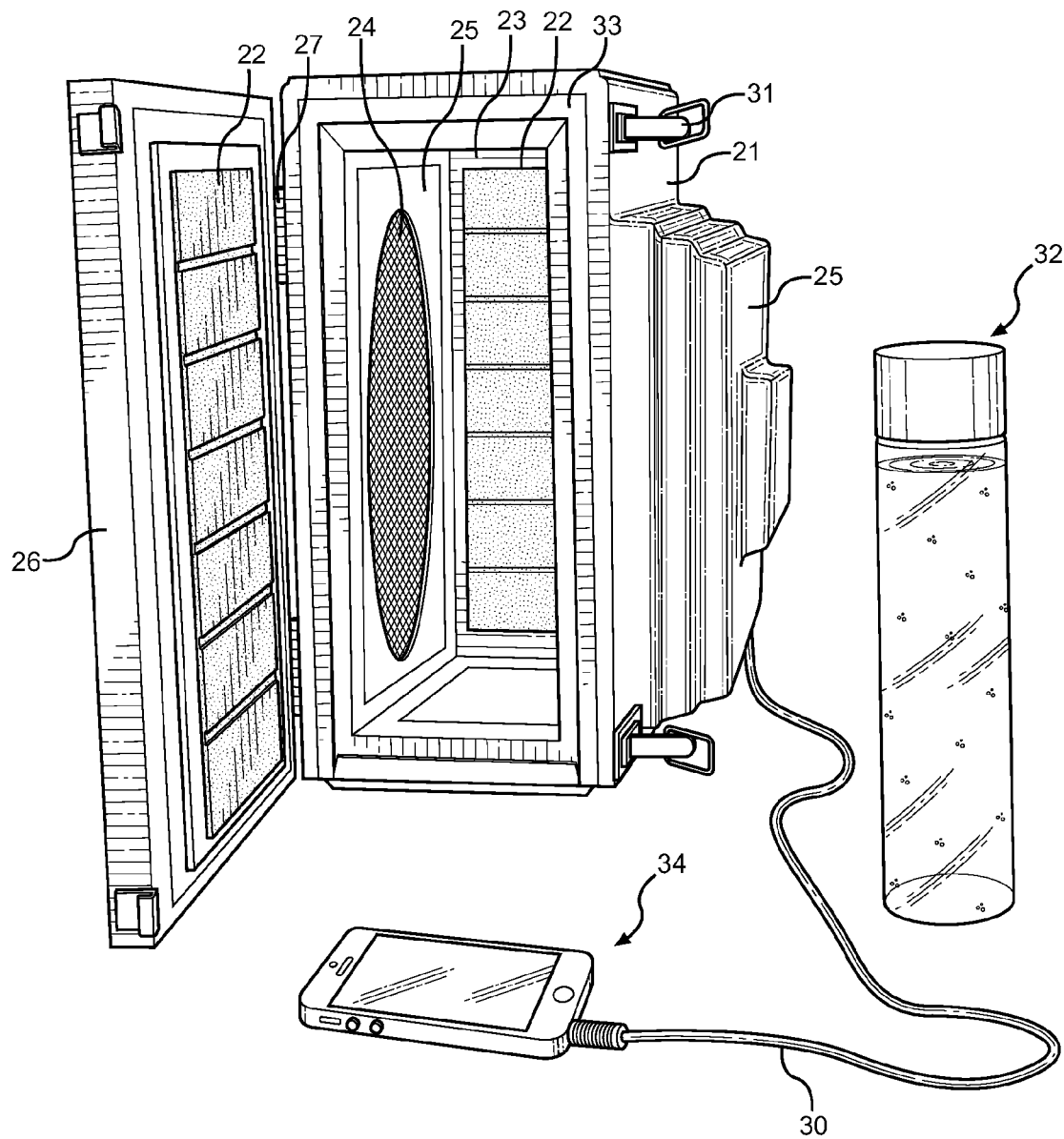

This application claims the benefit of U.S. Provisional Application No. 61/860,077 filed on Jul. 30, 2013. The above identified patent application is herein incorporated by reference in its entirety to provide continuity of disclosure.

BACKGROUND OF THE INVENTION

Field of the Invention

The present invention relates to a device for altering water structure using sound waves. More specifically, the invention relates to a combination of an enclosure and a speaker system, comprising a cabinet with speakers mounted within the cavity of the cabinet. A user fills a container full of water and places it inside the cabinet so that the exterior surface of the container is making direct contact with the cone or voice coil of the speakers. The device can be connected to any sound system. When an audio recording is played through the speakers, the cone or the voice coil creates vibrations on the surface of the container, which generates sound waves directly through the water in the container. Exposing water to sound waves in this manner changes the structure of the water in the container.

Water molecules comprise one oxygen and two hydrogen atoms. The oxygen atom further comprises six electrons and each of the hydrogen atoms comprises one electron. The two hydrogen atoms each pair with one electron from the oxygen atom, resulting in two lone pairs of electrons on the oxygen atom. The two lone pairs of electrons make the oxygen atom a highly electronegative atom. As such, each of the lone pairs of electrons form a hydrogen bond with a hydrogen atom on another water molecule. These intermolecular hydrogen bonds are weak and therefore they are constantly breaking and reforming, which affects many of the physical and chemical properties of water. The physical and molecular shape of water easily adapts to its environment. In a solid state, water molecules are organized in a crystalline form. In a liquid state, the arrangement of the water molecules is random, often forming large clusters of water molecules. Water, however, can remain in a liquid state in a quasi-crystalline form, or a liquid crystalline form. Liquid crystals are flexible and many times more responsive than solid crystals. Water that forms a crystalline structure in a liquid state is more commonly known as structured water. Similar to ice, structured water can transmit signals and energy using its repeating structural pattern as a pathway.

Energy or vibrations in the environment changes the molecular shape of water. For example, a sound wave has the ability to change the molecular structure of water based upon its frequency and systematic resonance. Specifically, when sound waves travel through water, the water experiences a change in pressure. The changes in pressure vibrates the water molecules and alters the geometric structure of the water molecules, such that the water molecules arrange in clusters of six or less individual molecules of water. Additionally, water molecules may form a coherent geometric shape depending on the frequency of the sound, similar to the shapes formed in a solid state. Water in this form is referred to as structured water.

Structured water can be used for agricultural, industrial, household, recreational, and environmental activities. Although structured water has a variety of applications, studies show that structured water has numerous health benefits. Specifically, much of the water in human body, including cells and tissues, is in a liquid crystalline form. The crystalline structure of structured water allows the tissues to transmit signals and other biological information to every cell. For example, structured water keeps the DNA stable by supporting the electromagnetic field surrounding the DNA. As such, drinking structured water allows for a more efficient transmission of biological information between cells.

Obtaining structured water can be expensive and impractical, however. Current common methods of making structured water are often time consuming, expensive, and difficult. Many prior art devices for altering the structure of water require extensive maintenance and expensive replacement parts. The present invention is a combination of an enclosed cabinet and a sound system for altering water structure. The device includes a cabinet for holding a container of water. The cabinet has speakers mounted within its cavity. The speakers fit through a housing having a surface adapted to rest directly against the container of water. The speakers can broadcast audio recordings directly through the container, controllably altering the structure of the water contained therein. The present invention provides an effective and convenient way to make structured water for everyday use. The device is compact and easy to use as it can be used with any sound system. The present invention is ideal for use in homes, workplaces, and other similar venues.

Description of the Prior Art

There are several devices in the prior art that claim audio systems and a device for resonating water. These include devices that have been patented and published in patent application publications. These devices generally relate to devices that include a speaker system. These devices, however, do not disclose an enclosure with speakers mounted within the cavity of the enclosure. The prior art also fails to disclose an enclosure for generating sound waves directly to an enclosed container of water. As a result, the prior art devices do not effectively alter the structure of water. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 7,319,766 to Hall. The Hall device discloses an in-wall speaker assembly, comprising a rectangular housing, a cone and surround of a speaker, and a voice coil. The Hall speaker system is mounted within a wall, preferably between wall studs, to maximize a space in an interior of a home and minimize vibration in the wall. While the device of Hall discloses a speaker system mounted in an enclosed area, the purpose and design of the Hall device differs from the present invention. The present invention is a device for making structured water by generating sound waves that pass directly through a container filled with water. Unlike the Hall device, which minimizes vibration, the present invention utilizes vibration to change water structure. The present invention is a device that allows a user to easily produce structured water by placing a watertight container between two speakers facing each other so that the cone or the voice coil of the speakers are touching the container to generate sound waves through the water therein.

Similarly, U.S. Published Patent Application 2008/0085029 to Hagman also discloses an in-wall speaker system comprising a base frame, a speaker assembly, and an active member. Like the Hall device, the Hagman device is embedded in a wall. While the device of Hagman also discloses a speaker system in an enclosed wall, the Hagman device fails to address the issue of producing structured water by generating sound waves directly to the water. As such, the Hagman device does not disclose a speaker system having two speakers that face each other. Additionally, the enclosed wall is not adapted to receive a container for receiving sound waves. The present invention addresses this issue by providing a rigid cavity adapted to receive a watertight container. The container is directly exposed to the vibrations from the cone or the voice coil on the speakers placed within the cavity.

Another device, U.S. Published Patent Application 2007/0165899 to Garin describes an audio headphone comprising a headband, a speaker, and a shell. The speakers are designed to be positioned in front of the ear, without making contact the ear. While the Garin device works with any sound system and generates sound waves, the Garin device differs from the present invention in that the speakers of the Garin device do not make direct contact with anything. Additionally, the speakers of the Garin device are not mounted in an enclosure. The present invention includes a cabinet having a cavity in which the speakers are enclosed. When the watertight container is placed between the speakers inside the cabinet, the cone or the voice coil of the speakers directly contact the walls of the container. This allows sound waves to vibrate the water inside the container and change its form from liquid to liquid crystalline. Because the speakers of the Garin device would not make a direct contact with the container, it would not be able to generate sound waves directly to the water.

Yet another prior art device, U.S. Published Patent Application 2011/0196188 to Giertz describes a method and apparatus to create resonance in water. Giertz discloses creating resonance in water by exposing water to electromagnetic energy. The electromagnetic energy interferes with the resonance created by organisms such as bacteria. The waves generated from electromagnetic radiation differ from waves generated by sound, however. In the present invention, sound waves are formed from the vibration of a speaker cone and propagated through the water. Electromagnetic energy, on the other hand, is produced from electromagnetic radiation, which is composed of waves. Unlike sound waves, electromagnetic waves do not require a medium through which to propagate. While creating resonance using electromagnetic energy can improve the water quality, the Giertz device does not change the structure of the water. In contrast, the present invention converts the water from a liquid form to a liquid crystalline form. As a result, the water produced from the present invention can perform different functions compared to the water produced from the Giertz device. Specifically, the structured water generated by the present invention can transmit signals, rather than interfere with resonance created from organisms in the water.

The present invention discloses a combination of an enclosure and a speaker system adapted for altering the structure of water. The device includes an enclosed cabinet for holding a watertight container, wherein the container is preferably glass. The cabinet further includes speakers that are pivotably mounted within the cavity of the cabinet. The speakers may have a housing that rests flush against the container of water. The speakers can broadcast audio recordings directly at the container to structure water using any sound system. Specifically, the voice coil or the cone of the speakers make direct contact with the walls of the container holding the water so that the walls of the container vibrate with the cone of the speaker, propagating the sound waves directly through the water. The present invention provides an effective and convenient way to make structured water for various uses. While the devices disclosed in the prior art include various audio systems and a device for resonating water, none of these devices disclose an audio system adapted to structure water by generating sound waves.

It is submitted that the present invention is substantially divergent in design elements from the prior art and consequently it is clear that there is a need in the art for an improvement to existing audio systems and a device for resonating water. In this regard the instant invention substantially fulfills these needs.

SUMMARY OF THE INVENTION

In view of the foregoing disadvantages inherent in the known types of audio systems now present in the prior art, the present invention provides a new device wherein the same can be utilized for providing convenience for the user when making structured water.

It is therefore an object of the present invention to provide an apparatus for making structured water that has all of the advantages of the prior art and none of the disadvantages.

It is another object of the present invention to provide an apparatus for making structured water using enclosed speakers that expose sound waves directly to the water and where the sound waves change the structure of the water.

Another object of the present invention is to provide an apparatus for making structured water that has a rigid enclosure for a watertight container with speakers mounted within the cavity of the enclosure, where the speakers are adapted to rest directly against the watertight container and the container makes direct contact with the cone or the voice coil of the speakers.

Yet another object of the present invention is to provide an apparatus for making structured water that is compatible with any sound source.

Yet another object of the present invention is to provide an apparatus for making structured water with a sound-absorbing material lined in an interior surface of an enclosure to reduce the impurity of the sound waves traveling through the water.

Still yet another object of the present invention is to provide an apparatus for making structured water that is compact and convenient for everyday use.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 displays a frontal perspective view of the present invention.

Figure 2:
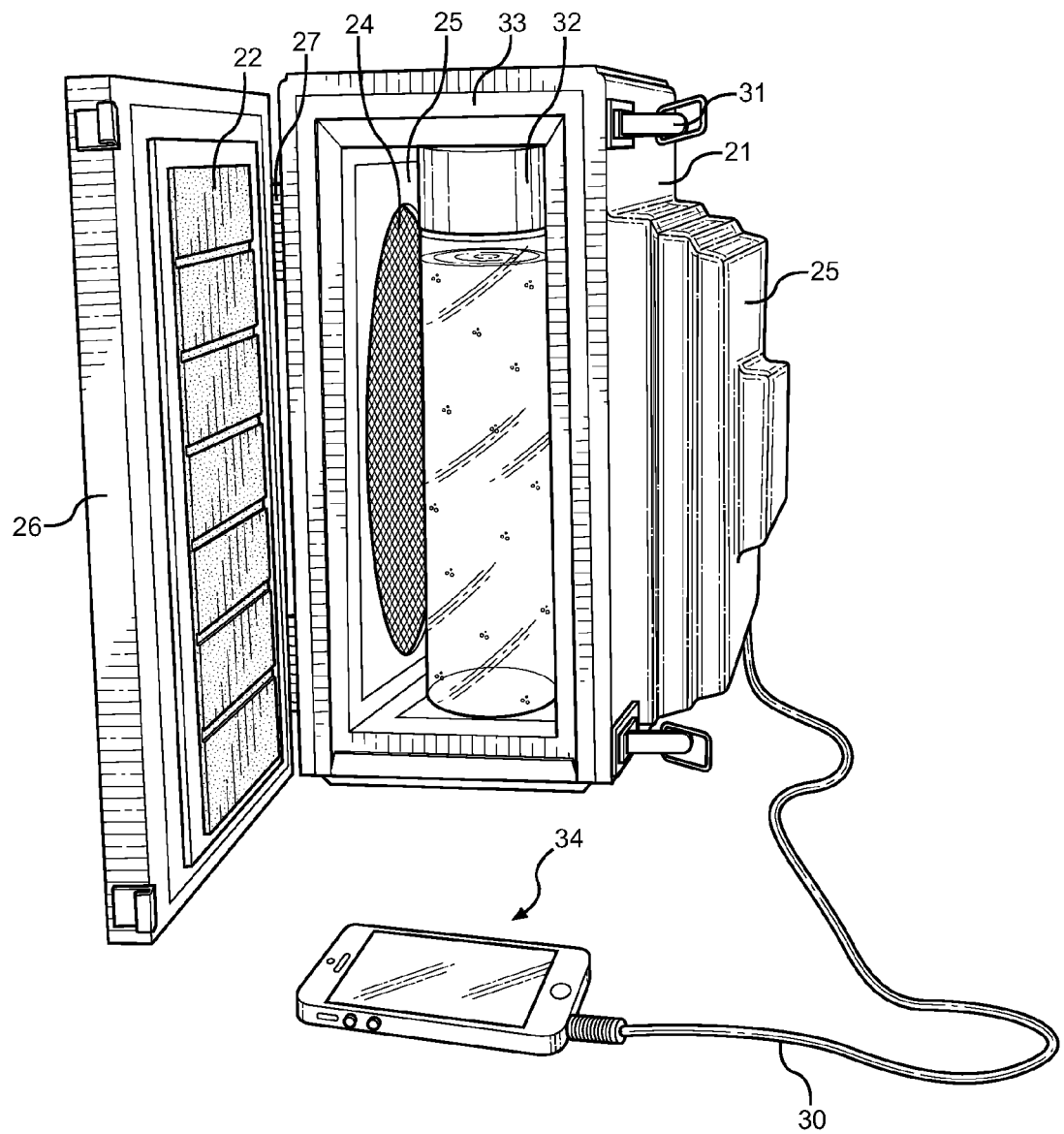

FIG. 2 displays another perspective view of the present invention.

Figure 3A:
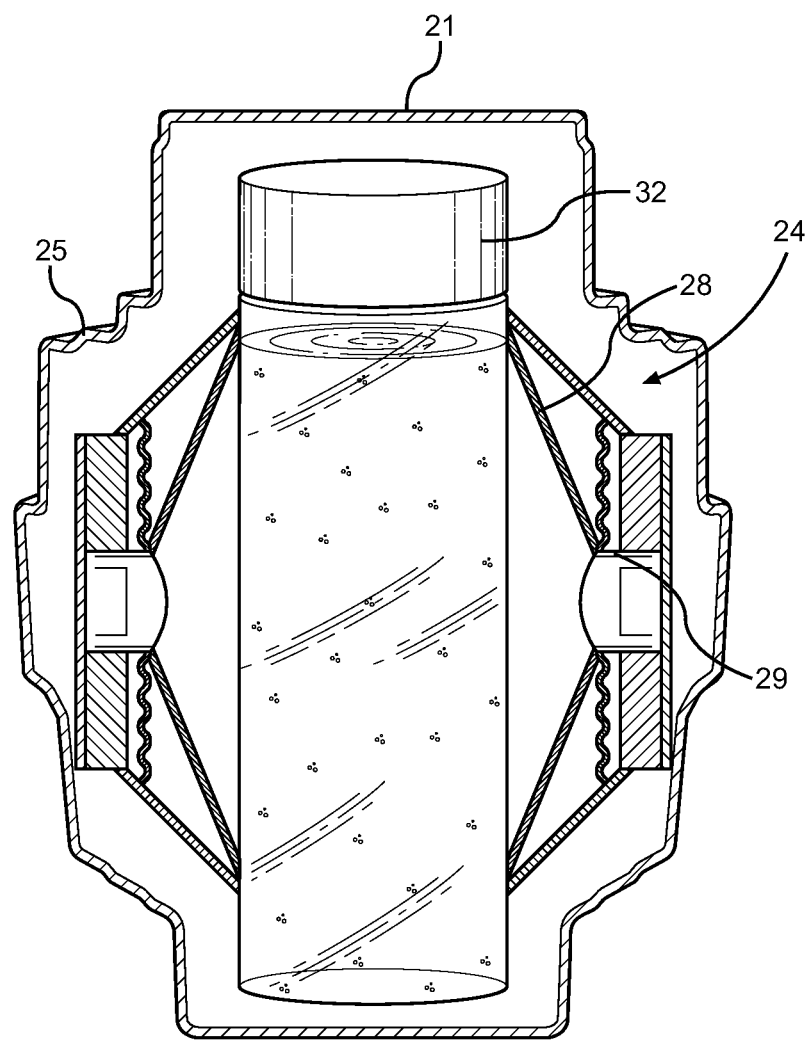

FIG. 3A displays a cross sectional view of the present invention.

Figure 3B:
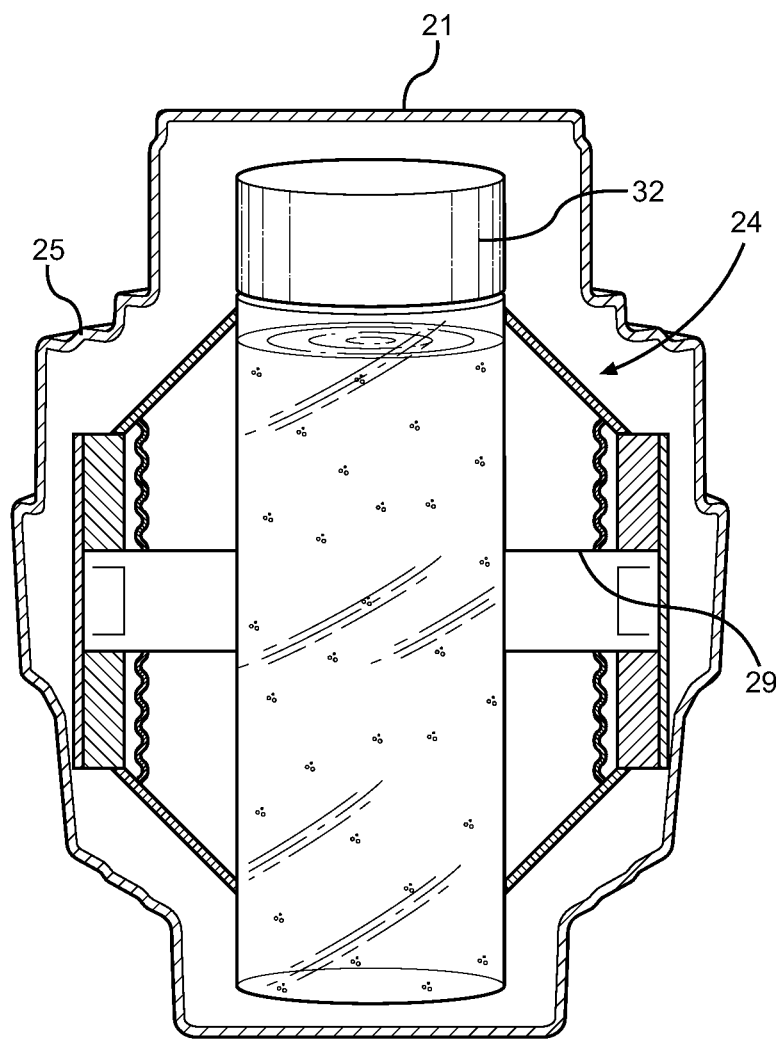

FIG. 3B displays a cross sectional view of another embodiment of the present invention.

Figure 4:
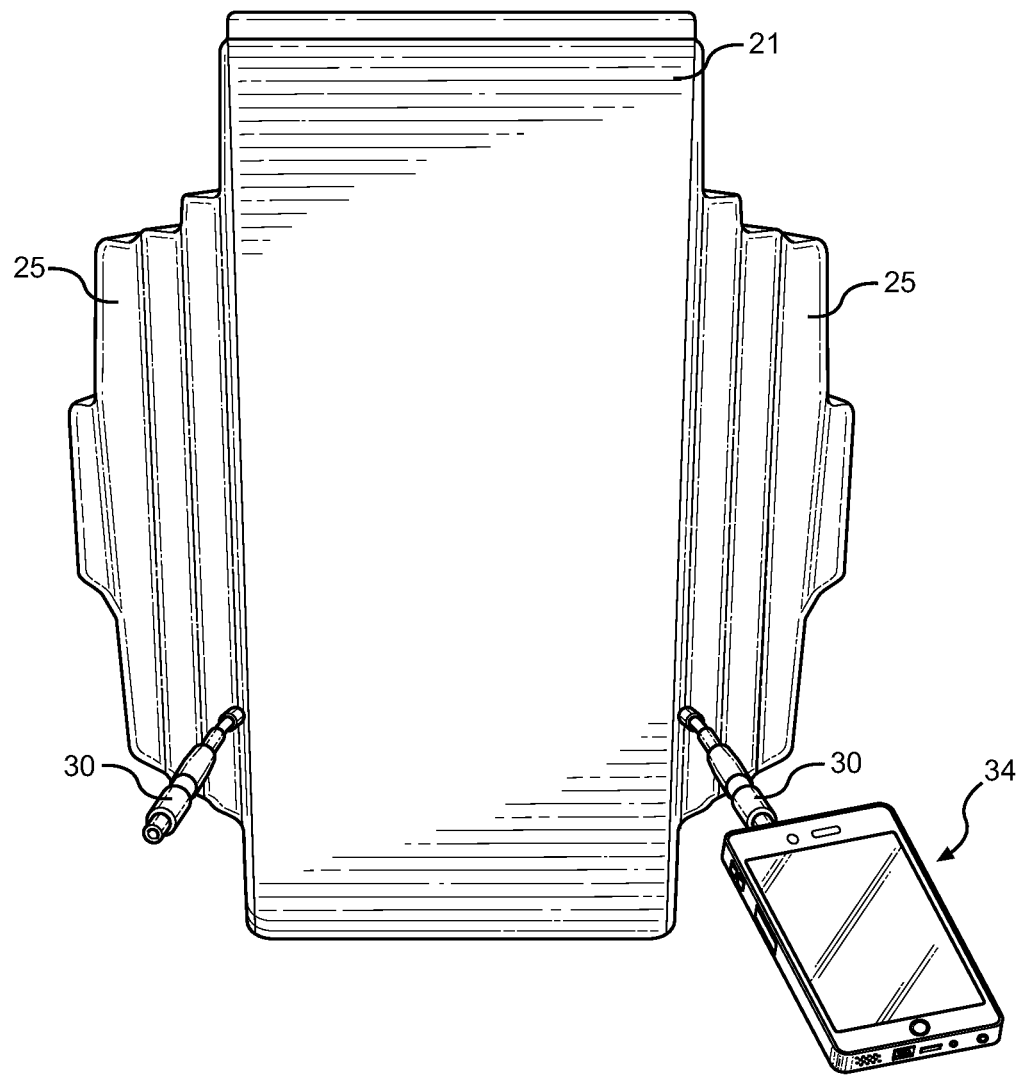

FIG. 4 displays a rear view of the present invention.

Figure 5:
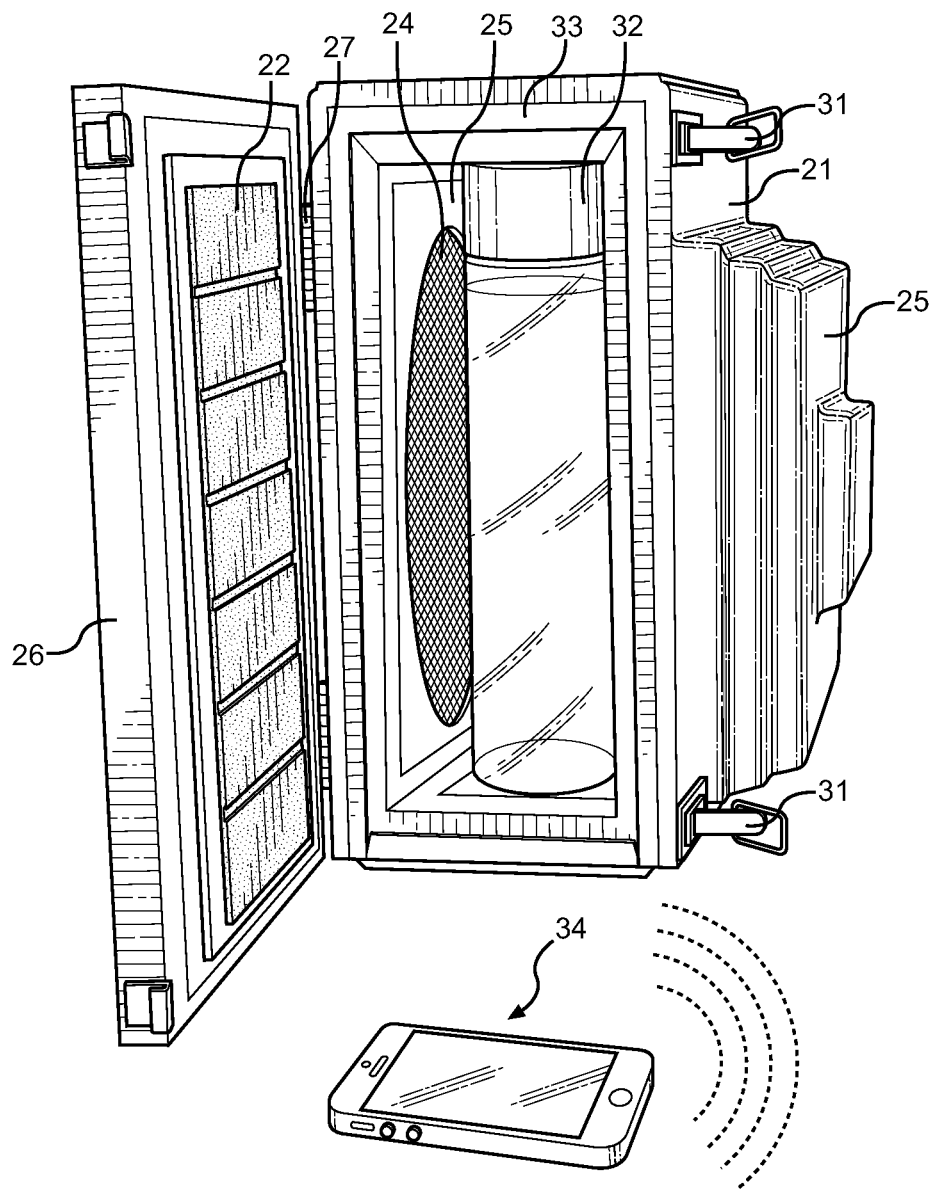

FIG. 5 displays another embodiment of the present invention.

Figure 6:
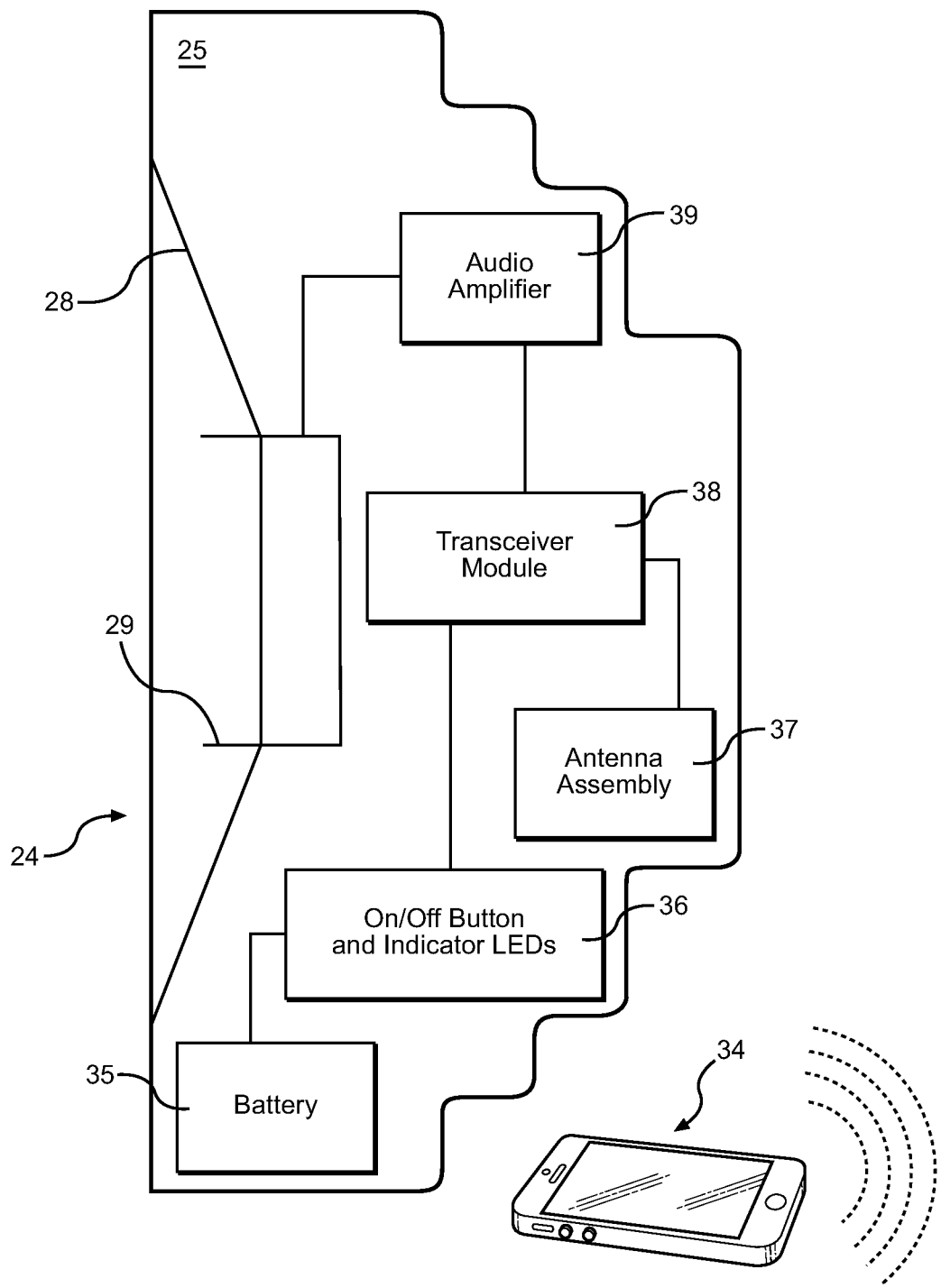

FIG. 6 displays an exemplary block diagram of the wireless feature of the present invention.

Figure 7:
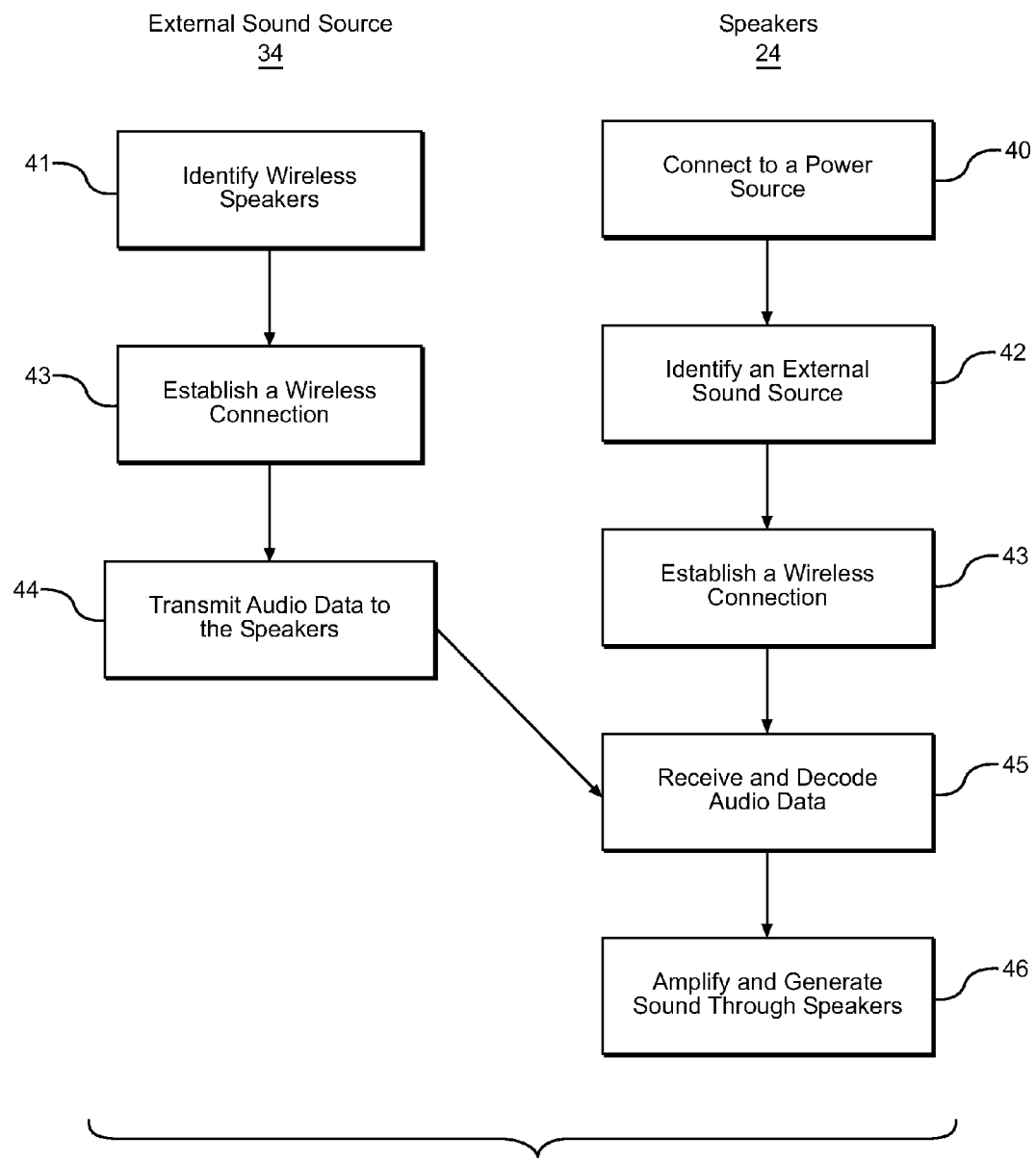

FIG. 7 displays a flow diagram showing the operation of the wireless feature of the present invention.

DETAILED DESCRIPTION OF THE INVENTION

Reference is made herein to the attached drawings. Like reference numerals are used throughout the drawings to depict like or similar elements of the apparatus for making structured water. For the purposes of presenting a brief and clear description of the present invention, the preferred embodiment will be discussed as used for altering the structure of the water. The figures are intended for representative purposes only and should not be considered to be limiting in any respect.

Referring now to FIGS. 1 and 2, there are shown frontal perspective views of the present invention. The present device for altering water structure includes a boxlike cabinet 21 constructed from a rigid material, such as wood, plastic, or other suitable material. The cabinet 21 includes a sound-absorbing material 22 lined along its interior surface 23. The sound-absorbing material 22 comprises a thick, high density material, such as rubber foam sheets or polyester sound absorbing pads, with a smooth surface designed to reduce noise transmission between the cavity of the cabinet 21 and the space surrounding the exterior of the cabinet 21. The sound-absorbing material 22 may be attached to the interior surface 23 using an epoxy, a peel-and-stick backing, or other adhesives. The cabinet 21 further includes two speakers 24, where each speaker 24 is positioned in an enclosed housing 25 attached to the opposite sides of the cabinet 21. Two opposing sides of the cabinet 21 have a cutout to allow the speakers 24 to be mounted facing toward the center of the cabinet 21. When the speakers 24 are mounted, the speakers 24 face each other inside the cavity of the cabinet 21.

The cavity of the cabinet is adapted to receive a watertight container 32, preferably comprising glass or glass-like material, between the speakers 24. To access the cavity, a user can open the cabinet 21 by opening a door 26 outwards on one side of the cabinet 21, which is hinged to the cabinet 21 by metal hinges 27. The surface of the door 26 facing the cavity of the cabinet 21 is also lined with the sound-absorbing material 22. The door opening is lined with a gasket 33 to seal the cabinet 21 when a user closes the door 26 and secures it closed with metal clasps 31. The dimensions of the cabinet 21 depend on the size and shape of the container 32 to be placed in the cavity of the cabinet 21.

The speakers 24 may be any form of a preferably self-powering device capable of translating an electrical signal from an external sound source 34 into an audible sound. In an exemplary embodiment of the present invention depicted in FIGS. 1 and 2, the external sound source 34 connects to the speakers 24 using a phono connector 30. The phono connector 30 mounts to a female jack or a socket located on the external sound source 34. The phono connector 30 carries an audio signal from the external sound source 34 to the speakers 24. The front of the speaker 24 is exposed in the cavity of the cabinet 21, and the rest of the speaker system is enclosed in the housing 25, which is also mounted within the cabinet 21. The housing 25 is sized to provide proper ventilation to prevent the speakers 24 from overheating. The outer edge of the front of the speaker 24 is sealed in order to prevent sound from exiting the cabinet 21. The surface of the housing 25 immediately surrounding the speakers 24 may be adapted to fit snugly around the container 32 when it is inserted in the cavity of the cabinet 21. The speakers 24 are positioned so that the surfaces of the speakers 24 are directly touching the exterior surface of the container 32 when it is placed within the cavity of the cabinet 21.

Referring now to FIGS. 3A and 3B, there are shown two embodiments of the speakers 24 of the present invention. In FIG. 3A, the speakers 24 further include a cone 28 and a voice coil 29. The exterior surface of the container 32 is positioned such that it is in direct contact with the cones 28 from both speakers 24. Therefore, sound waves generated by the cones 28 are transmitted directly through the exterior surface of the container 32, without passing through an intermediate medium, when an audible sound is played through the speakers 24. Thus, the vibrations projected from the cones 28 are also projected from the exterior surface of the container 32. In the embodiment of the present invention depicted in FIG. 3B, the speakers 24 include a voice coil 29, but do not include a cone 28. If the speakers 24 do not have a cone 28, the housing 25 and the container 32 are sized such that the exterior surface of the container 32 is flush against the voice coils 29 from both speakers 24. Accordingly, the voice coil 29 vibrates on the exterior surface of the container 32, allowing the surface of the container 32 to act as the cone 28. The vibrations from the voice coil 29 allow the surface of the container 32 to move the water in the container 32 in a pulsing, wave-like motion. The pressure created from the wave-like motion alters the structure of the water contained therein from a liquid to a liquid crystalline form. The systematic resonance from certain audible recordings may further arrange the water molecules into known, coherent geometric shapes. Any excess sound waves are absorbed by the sound-absorbing material 22 lined along the interior surface 23. The sound-absorbing material 22 helps prevent the cabinet 21 from vibrating, which can interfere with the vibrations from the voice coil 29 and thereby alter the sound waves produced.

Referring now to FIG. 4 there is shown a rear view of the present invention. The present invention is compatible with any external sound source 34, such as a radio or a portable music player, where the sound source is plugged directly into the speakers. The external sound source 34 may also supply power. When in use, the speakers and the sound source are turned on and the built-in amplifier in the speakers alters the signal from the sound source into voltage, which is replicated as audible sound through the speakers. The speakers may be also delivered by a portable battery, A/C house current or USB voltage.

In an exemplary embodiment of the present invention depicted in FIG. 4, the present invention includes a phono connector 30 connected to a smart phone. The phono connector 30 of the present device may include an RCA jack for using a stereo as a sound source, a head phone jack for using a portable audio device, or a USB connector for using a computer. A wide range of phono connectors 30 are compatible for use with the speakers of the present invention, allowing a user to use a variety of external sound source devices. The phono connectors 30 may be located near the rear of the cabinet 21. The phono connectors 30 are threaded through a small aperture created on the cabinet 21. The area surrounding the small aperture is completely sealed to prevent any sound from exiting the cabinet 21.

Referring now to FIG. 5, there is shown a view of the present invention connected to an external sound source 34 via a short-range wireless interconnection system. In this embodiment, the speakers 24 of the present invention may be powered by batteries or plugged into a power source. The wireless capability may include Bluetooth technology or similar architecture, which allows interaction of the present invention with other electronic devices function as an external sound source 34. Once the device is connected to an external sound source 34, the sound source sends a signal that the speakers 24 can receive and converts it into electricity in order to drive the voice coil 29 inside the speakers 24. Any electronic circuits or antennas required to complete this wireless connectivity task may be imbedded within the cavity of the housing 25, while a button 36 on the exterior surface of the cabinet 21 may be utilized for providing input control for the wireless connection.

Referring now to FIGS. 6 and 7, there are shown diagrams of the use of the wireless feature of the present invention. As disclosed previously, the wireless connectivity assembly may be preferably embedded in the cavity of the housing 25. To use the wireless feature of the present invention, a user first provides power supply to the speakers 24 via batteries 35 or a connection to a power source 40. A user may use a power button 36 to turn the speakers 24 on and off. The power button 36 may further comprise indicator LEDs that flash when the power is on and an external sound source 34 is identified 42. Turning on the power enables the speakers 24 to be detected or identified by a wireless compatible external sound source 34, such as a smart phone or an MP3 player 41.

The wireless communication is established 43 between the speakers 24 and the external sound source 34. The wireless connection is established 43 between the speakers 24 and the external power source 34 by identifying the speakers 24 and the external sound source 34 and pairing the two devices. When a wireless connection is established, the user may select an audio recording on the external sound source 34 and an audio signal is transmitted 44. An antenna assembly 37 of the present invention receives the audio signal 45 from the external sound source 34. A transceiver module 38, which is connected to the antenna assembly 37, receives and decodes the audio signal 45. Once the decoded audio signal is transmitted through the audio amplifier 39, an audible sound or a recording is played 46 through the speakers 24.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device adapted for altering water molecules' structure, comprising:
    a boxlike cabinet having a cavity and an interior surface;
    wherein said cavity is adapted for receiving a container;
    said container having an exterior surface;
    a speaker system comprising a connection assembly and a plurality of speakers mounted to said cabinet;
    wherein each speaker of said plurality of speakers is mounted oppositely on said interior surface within said cavity and positioned facing each other within the cavity;
    wherein each speaker of said plurality of speakers rests flush against said exterior surface of said container;
    a sound-absorbing material lined along said cabinet interior surface.

2. The device adapted for altering water molecules' structure of claim 1, wherein said connection assembly further comprises a phono connector.

3. The device adapted for altering water molecules' structure of claim 1, wherein said connection assembly further comprises a short-range wireless interconnection system, wherein said wireless interconnection system comprises a power source, a power button and indicator LEDs, an antenna, a transceiver module, and an amplifier.

4. The device adapted for altering water molecules' structure of claim 1, wherein said speaker system is wireless enabled.

5. The device adapted for altering water molecules' structure of claim 1, wherein said connection assembly further comprises a USB connector.

6. The device adapted for altering water molecules' structure of claim 1, wherein said speaker system comprises at least one powered speaker.

7. The device adapted for altering water molecules' structure of claim 1, further comprising a power source.

8. The device adapted for altering water molecules' structure of claim 1, further comprising an external sound source.

9. The device adapted for altering water molecules' structure of claim 1, further comprising an external sound source, wherein said external sound source is wireless enabled.

10. The device adapted for altering water molecules' structure of claim 1, wherein said sound absorbing material comprises a rubber foam sheet.

11. The device adapted for altering water molecules' structure of claim 1, wherein said sound absorbing material comprises a polyester sound absorbing pad.

12. The device adapted for altering water molecules' structure of claim 1, further comprising:
    a door opening disposed on said boxlike cabinet;
    wherein said door opening is lined with a gasket;
    a door having an inner surface;
    wherein said door is affixed to said door opening by a connection means.

13. The device adapted for altering water molecules' structure of claim 12, wherein said connection means is a hinge.

14. The device adapted for altering water molecules' structure of claim 12, wherein said door inner surface further comprises said sound-absorbing material.

15. The device adapted for altering water molecules' structure of claim 1, wherein said plurality of speakers further comprise a cone.

16. The device adapted for altering water molecules' structure of claim 15, wherein said cone rests flush against said exterior surface of said container.

17. The device adapted for altering water molecules' structure of claim 1, wherein said plurality of speakers further comprise a voice coil.

18. The device adapted for altering water molecules' structure of claim 17, wherein said voice coil rests flush against said exterior surface of said container.

19. A device adapted for altering water molecules' structure, comprising:
- a boxlike cabinet having a cavity and an interior surface;
- wherein said cavity is adapted for receiving a container;
- said container having an exterior surface;
- a speaker system comprising a connection assembly and a plurality of speakers mounted to said cabinet;
- wherein each of said plurality of speakers is mounted oppositely on said interior surface within said cavity and each of said plurality of speakers rests flush against said exterior surface of said container;
- wherein the plurality of speakers further comprise a cone, the cone configured to rest flush against said exterior surface of said container;
- a sound-absorbing material lined along said cabinet interior surface.

20. A device adapted for altering water molecules' structure, comprising:
- a boxlike cabinet having a cavity and an interior surface;
- wherein said cavity is adapted for receiving a container;
- said container having an exterior surface;
- a speaker system comprising a connection assembly and a plurality of speakers mounted to said cabinet;
- wherein each of said plurality of speakers is mounted oppositely on said interior surface within said cavity and each of said plurality of speakers rests flush against said exterior surface of said container;
- wherein the plurality of speakers further comprise a voice coil, the voice coil configured to rest flush against said exterior surface of said container;
- a sound-absorbing material lined along said cabinet interior surface.

* * * * *